P. MANDEVILLE.
APPARATUS FOR PREPARING FLATS FOR USE IN EGG CASE FILLERS.
APPLICATION FILED MAR. 16, 1914.
1,143,055.
Patented June 15, 1915.
3 SHEETS—SHEET 1.
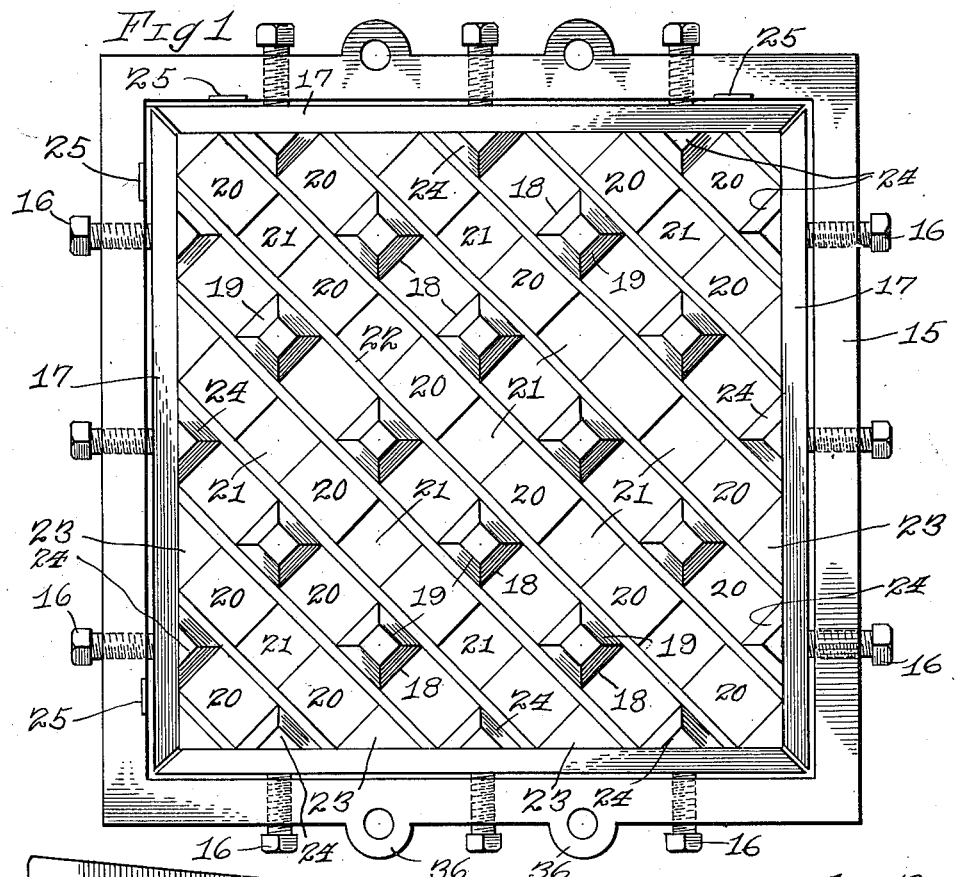
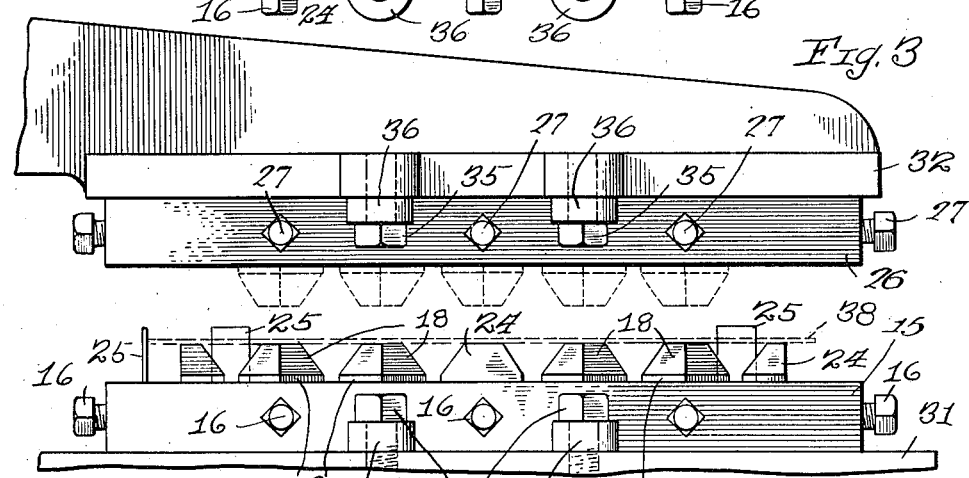

P. MANDEVILLE.
APPARATUS FOR PREPARING FLATS FOR USE IN EGG CASE FILLERS.
APPLICATION FILED MAR. 16, 1914.
1,143,055.
Patented June 15, 1915.
3 SHEETS—SHEET 2.
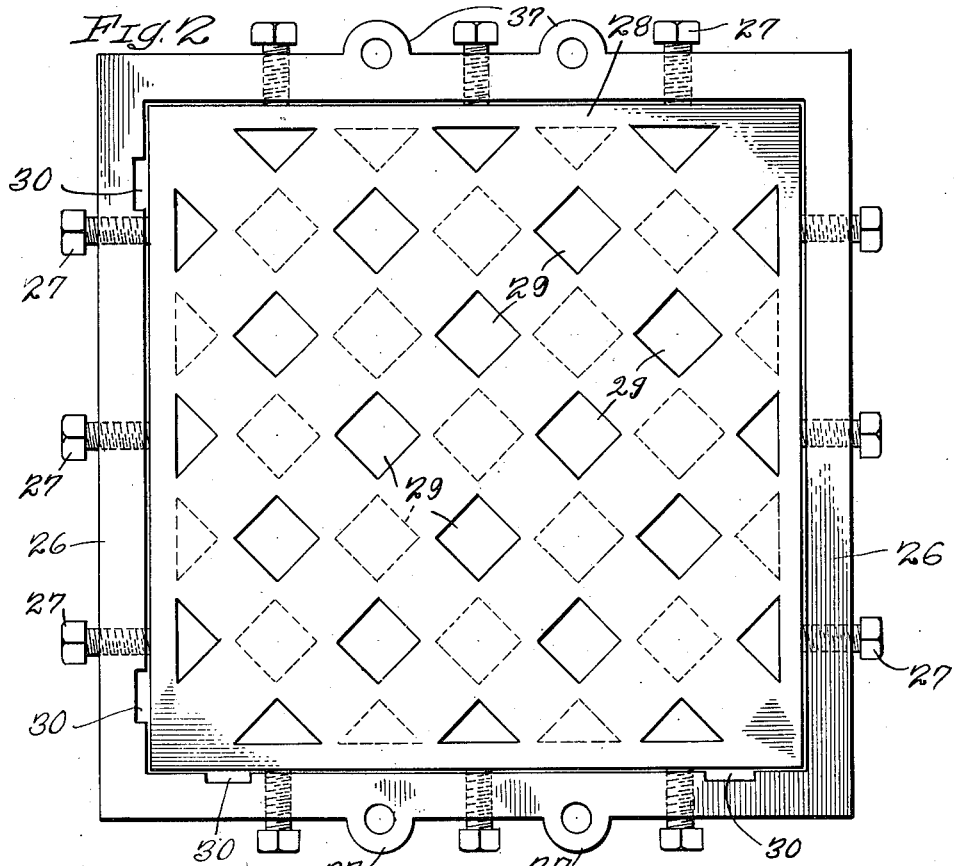
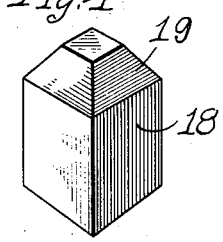
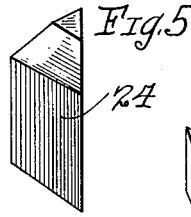
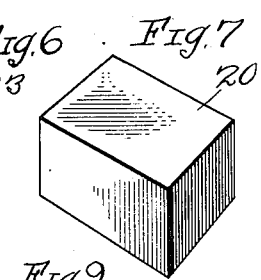
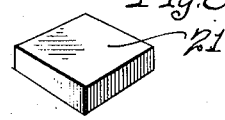
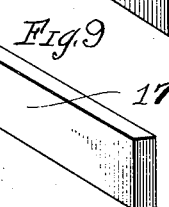
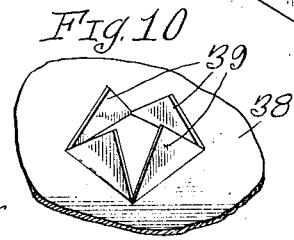
Witnesses:
L. B. Graham
R. L. Farrington
Inventor:
Paul Mandeville
By Adams Jackson
Att'ys.

P. MANDEVILLE.
APPARATUS FOR PREPARING FLATS FOR USE IN EGG CASE FILLERS.
APPLICATION FILED MAR. 16, 1914.
1,143,055.
Patented June 15, 1915.
3 SHEETS—SHEET 3.
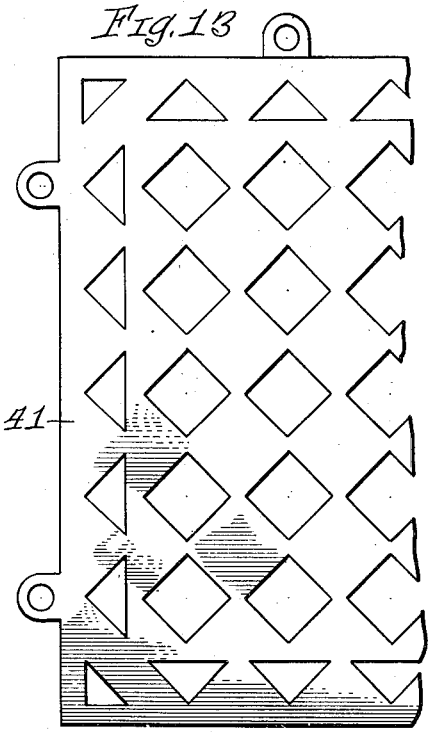
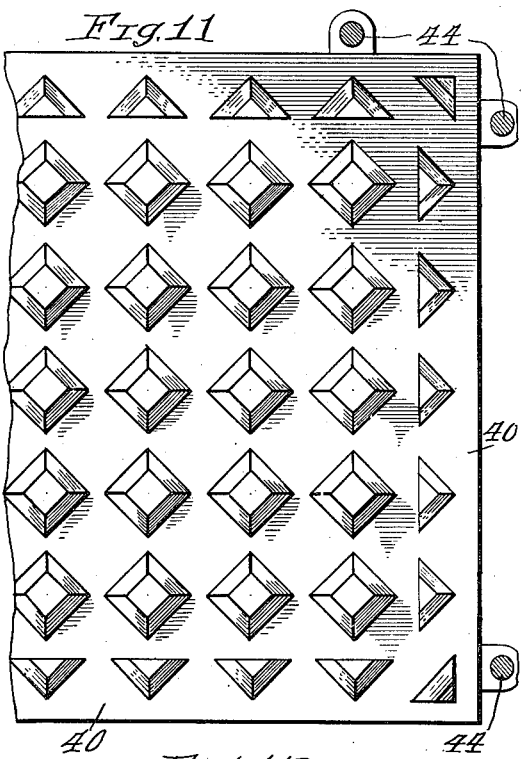
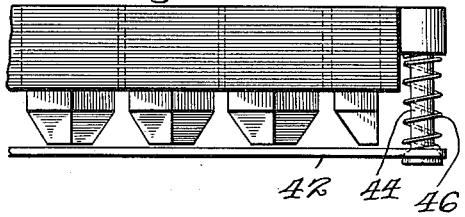
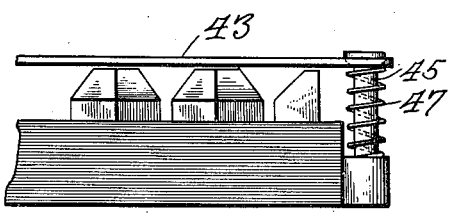
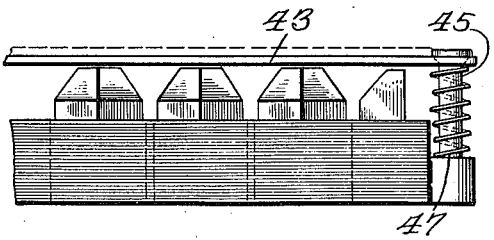
Witnesses:
L. B. Graham
Inventor:
Paul Mandeville,
By Adams & Jackson,
Att'ys.

UNITED STATES PATENT OFFICE.

PAUL MANDEVILLE, OF LAKE BLUFF, ILLINOIS.

APPARATUS FOR PREPARING FLATS FOR USE IN EGG-CASE FILLERS.

1,143,055.   Specification of Letters Patent.   Patented June 15, 1915.

Application filed March 16, 1914. Serial No. 825,051.

*To all whom it may concern:*

Be it known that I, PAUL MANDEVILLE, a citizen of the United States, residing at Lake Bluff, in the county of Lake and State of Illinois, have invented certain new and useful Improvements in Apparatus for Preparing Flats for Use in Egg-Case Fillers, of which the following is a specification, reference being had to the accompanying drawings.

In my pending application, Serial No. 805,920, filed December 11, 1913, for patent for improvements in egg case fillers, I have shown and described an egg case filler composed of a number of units of the usual reticulated type made of strips of straw-board, or equivalent material, and boards or "flats" having projections which engage certain members of the filler units to hold the same in operative position. Such flats are placed both between successive filler units and above the uppermost unit and below the lowermost unit. The intermediate flats have projections which engage the units above and below them, while the top and bottom flats have projections which engage the adjacent unit. Such projections are formed by making cross slits in the flat at appropriate points so that when the material in the angles of the slits is bent up or down the projections thus formed will be in position to engage the intersections of the filler units and hold them in proper operative position.

My present invention has to do with the formation of the projections above described after the cross slits in the flat have been made and the material has been properly scored or grooved to facilitate the deflection of the portions which form the projections, and has for its object to provide an apparatus by which all the projections of a flat may be formed at one operation and without damaging the flat, which is necessarily made of straw-board, or other cheap material.

A further object is to provide an apparatus which may be readily adjusted to vary the positions at which the projections are formed, as it is sometimes desirable to change the position of a number of the projections.

I accomplish these objects as illustrated in the accompanying drawings and as hereinafter described. What I regard as new is set forth in the claims.

In the accompanying drawings,—Figure 1 is a plan view of one of the frames used in my improved apparatus, showing the projecting members by which the projections of the flat are formed, and the manner in which they are secured in position; Fig. 2 is a plan view of a second frame which coöperates with the frame shown in Fig. 1; Fig. 3 is a side view showing the two frames applied to the supports by which they are carried, illustrating also in dotted lines an arrangement employed for making the intermediate flats; Fig. 4 is a perspective view of one of the removable projecting members with which the frame shown in Fig. 1 is equipped; Fig. 5 is a similar view showing a modified form of projecting member used for forming projections near the margins of the flat; Figs. 6, 7 and 8 are views showing spacing blocks; Fig. 9 is a view showing one of the marginal strips employed in the frame shown in Fig. 1; Fig. 10 is a perspective view showing the projections formed by the use of the apparatus described; Fig. 11 is a plan view showing a modified form of frame, in which the projecting members are formed integral with the frame; Fig. 12 is a partial edge view showing a modified construction of the upper and lower frames employed for making intermediate flats in which projections extend from both surfaces of the flat; Fig. 13 is a partial plan view showing the frame used in making the top and bottom flats; and Fig. 14 is a partial edge view, partly in section, showing the frames used in making the top and bottom flats in which the projections extend only from one surface of the flat.

The apparatus shown in Fig. 1 comprises a rectangular frame 15 having around its margins a series of set-screws 16 which bear against side strips 17 arranged parallel with the inner margins of the frame 15. The strips 17 act to bind the several parts together into a compact mass, as will hereinafter appear, but by loosening the set-screws 16 such parts may readily be separated and readjusted. 18 indicates a number of projecting members in the form of blocks having their upper ends tapered, as shown at 19 in Figs. 1 and 4. Said blocks are arranged symmetrically in rows spaced a distance apart by a series of spacing blocks 20—21 and spacing strips 22. The spacing blocks 21 and the strips 22 are of about the same thickness as the strip 17, so that their upper surfaces lie substantially flush with the upper surfaces of the frame 15, whereas the spacing blocks 21 are considerably thinner, so that indentations or recesses are formed wherever the blocks 21 are placed. Said blocks 21 are disposed in offset relation to the several projecting members 18, as shown in Fig. 1, for a purpose which will hereinafter appear. 23 indicates triangular spacing blocks employed wherever necessary to fill up the frame, and 24 indicates triangular projecting members which are employed at the margins of the frame, as shown in Fig. 1. 25 indicates stops which are provided on the frame 15 at two of its margins, as shown in Fig. 1. Said stops serve not only to position the flats, but also to insure registration of the upper and lower frames when they are brought together, as hereinafter described. 26 indicates a second frame, which is also provided with set-screws 27 around its margins for securing in position a rectangular plate 28 having a number of symmetrically-disposed openings 29 corresponding in shape to the projecting members 18 and 24. The frame 26 is also provided with recesses 30 which receive the stops 25 for registration purposes.

As best shown in Fig. 3, the frames 15 and 26 are adapted to be secured respectively to supports 31—32 in any suitable way, as by bolts 34—35 passing through ears 36—37 provided on said frames. One of said supports is made movable so that the frame carried by it may be moved into engagement with the opposite frame. When this is done the projecting members 18 and 24 enter the corresponding recesses in the plate 28.

The flat to be operated upon, which is shown in dotted lines at 38 in Fig. 3, after first being provided with the cross slits hereinbefore referred to, is placed upon the projecting members 18—24, two of its margins bearing against the stops 25. The two frames are then brought together, whereupon the projecting members are forced through the flat, deflecting the angular portions formed by the cross slits so that such angular portions are caused to project in the manner shown at 39 in Fig. 10. It will be noted that with this arrangement the projections would be formed at one surface only of the flat, as is necessary for the upper and lower flats in an egg case. For making intermediate flats in which the projections extend from both surfaces of the flat, the frame 28 is provided with projecting members similar to the members 18 and 24, which are placed in the positions indicated by dotted lines in Fig. 2. As illustrated in dotted lines in Fig. 3, such projections, when the two frames are brought together, enter the recesses provided by using the thin spacing blocks 21, and consequently the projecting members carried by one frame deflect certain of the slit portions of the flat upward, while the projecting members carried by the other frame bend certain other of the slit portions of the flat downward.

In Fig. 11 I have shown a frame 40 in which the several projecting members are formed integral with the base of the frame in which they are carried, this being accomplished by cutting away the material between the several projecting members. This construction may be employed where it is not desirable to change the position of the projections.

In Fig. 13 I have shown a coöperating frame 41 adapted to be employed in connection with either of the frames shown in Fig. 1 or Fig. 11.

In Fig. 12 I have shown a further modification in which both the upper and lower frames are provided with supporting plates 42—43, respectively, having perforations corresponding with the projecting members carried by said frames. Said plates are mounted upon studs 44—45 placed at suitable points around the margins of their respective frames and are normally held slightly beyond the ends of the projecting members by springs 46—47. When the frames are brought together the plates 42—43 move toward their respective frames, the projecting members extending through them. The object of this construction is to provide supports at both sides of the flat to be operated upon so that the flat is not apt to be torn and the projections formed are more sharply creased when bent so that they retain their angular position better than where the supporting plates are not used.

In Fig. 14 I have shown a similar form of apparatus designed for making the top and bottom flats, in which case only a single supporting plate 43 need be employed, since the projections on the flat extend from one surface thereof only.

I have not shown any mechanism for actuating the frames to move them toward and from each other, as any suitable mechanism for that purpose may be employed, and such mechanism forms no part of my present invention.

That which I claim as my invention, and desire to secure by Letters Patent, is,—

1. In apparatus of the type described, comprising a frame having a plurality of symmetrically-disposed members projecting above the surface thereof, the end portions of said projecting members being of uniform cross-sectional area and the extremities of the same being tapered, and a frame having a plurality of recesses into which said projecting members are adapted to fit.

2. An apparatus of the type described, comprising a frame having a plurality of symmetrically-disposed members projecting above the surface thereof, the end portions of said members being of uniform cross-sectional area and the extremities of the same being tapered, means for removably securing said members in position, and a frame having a plurality of recesses into which said projecting members are adapted to fit.

3. An apparatus of the type described, comprising a frame having a plurality of symmetrically-disposed members projecting above the surface thereof, the end portions of said members being tapered, and a coacting frame having similar projecting members in offset relation to the projecting members in said first-mentioned frame, whereby when said frames are brought together the projecting members of one frame lie in spaces between the projecting members of the other frame.

4. An apparatus of the type described comprising a pair of coacting frames each having a plurality of symmetrically disposed members projecting above the surface of the frame in offset relation to the members of the opposite frame, and having spaces between the members extending within the surface of the frame adapted to receive the members of the opposite frame when the frames are brought together.

5. An apparatus of the type described comprising a frame having a plurality of symmetrically disposed members projecting above the surface thereof, and a coacting frame having similar projecting members in offset relation to the projecting members in said first-mentioned frame, said frames each having spaces within the surfaces and between the members thereof whereby when said members are brought together the projecting members of one frame lie in the spaces in the surface of the other frame.

PAUL MANDEVILLE.

Witnesses:
MINNIE A. HUNTER,
ALBERT H. ADAMS.